United States Patent [19]

Kalbfleisch

[11] 4,270,849
[45] Jun. 2, 1981

[54] ROTARY VALVE ACTUATOR CONSTRUCTION

[76] Inventor: Adolphe W. Kalbfleisch, P.O. Box 64, Jeannette, Pa. 15644

[21] Appl. No.: 29,319
[22] Filed: Apr. 12, 1979
[51] Int. Cl.³ ............................................. F16K 31/00
[52] U.S. Cl. .................................. 251/292; 251/313; 137/75
[58] Field of Search ..................... 137/72, 73, 75–77; 251/292, 313, 315; 267/169

[56] References Cited

U.S. PATENT DOCUMENTS

| | | | |
|---|---|---|---|
| 513,319 | 1/1894 | Harding | 251/313 X |
| 1,831,021 | 11/1931 | Markel | 431/84 X |
| 2,022,846 | 12/1935 | Puddicombe | 431/84 |
| 2,768,806 | 10/1956 | Koehler | 251/313 X |
| 3,538,929 | 11/1970 | Botkin | 137/77 |
| 3,874,859 | 4/1975 | Krause | 251/292 X |

*Primary Examiner*—Harold W. Weakley
*Attorney, Agent, or Firm*—Parmelee, Miller, Welsh & Kratz

[57] ABSTRACT

A valve actuator unit is adapted to be removably mounted in a fixed operating relation with respect to the housing of a valve unit having a rotatable valve element by the utilization of an angle-shaped mounting bracket that is adapted to fit over a pair of bolts or studs of the valve housing that are used to maintain it in an assembled relation. The actuator has a rotatable bottom part that is adapted to be secured on the stem of the valve in place of its ordinary manual operating means or handle, and without disturbing its operating mechanism. Turning a handle of the actuator unit to move the valve to an open or closed position builds up spring tension which is employed to provide a smooth spring-actuated return movement. The actuator utilizes a helical return spring within its housing. Convolutions of the spring are positioned about a bearing sleeve and, in such a manner, that they do not interfere with each other when the spring is, in effect, wound-up or tensioned between a stationary housing upper end wall of the actuator and a lower disc-like rotative end wall.

The actuator has a simple and quick type of mounting and may be used to smoothly move a valve element or ball against the torque of the spring, either to an open or a closed position, as may be desired. Also, the actuator unit may be utilized for a fail-safe type of operation by, for example, using a fusible link between stationary and movable parts, such that under a melting temperature, the tensioned spring will move the valve element automatically to either a closed or open position, as may be desired.

5 Claims, 7 Drawing Figures

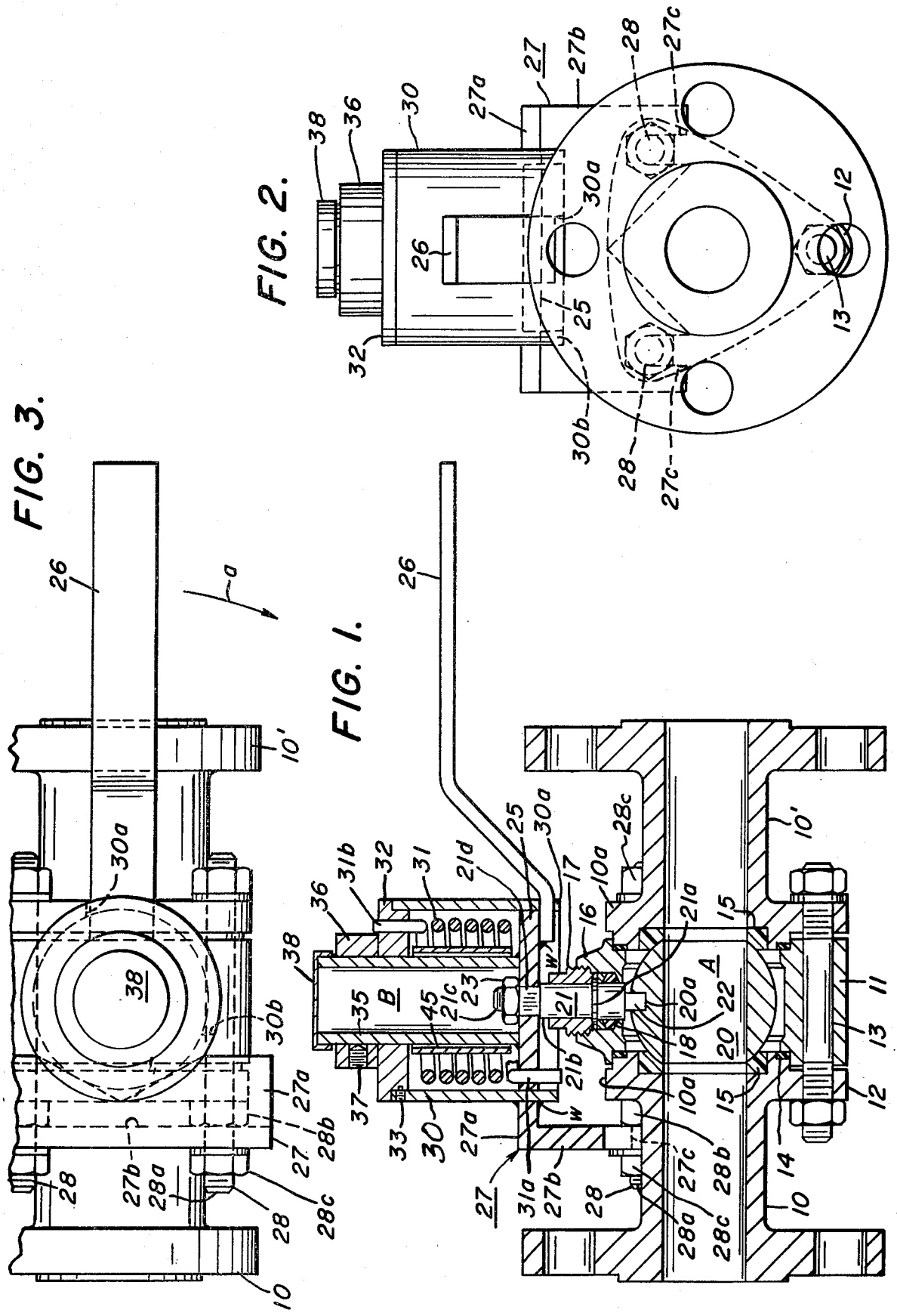

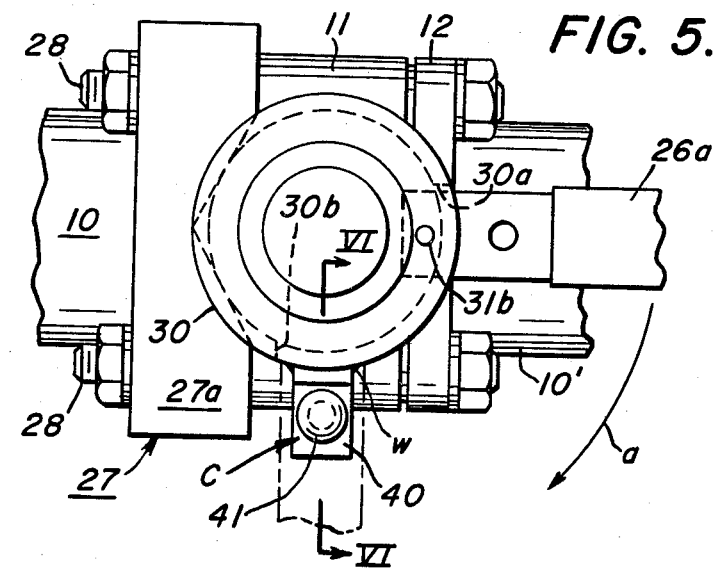
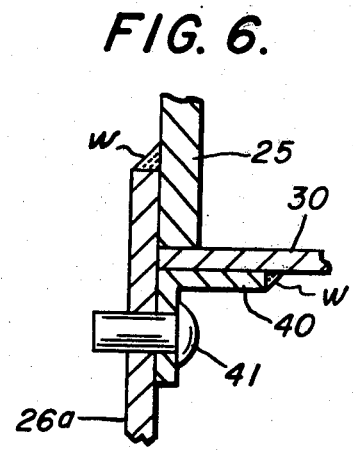
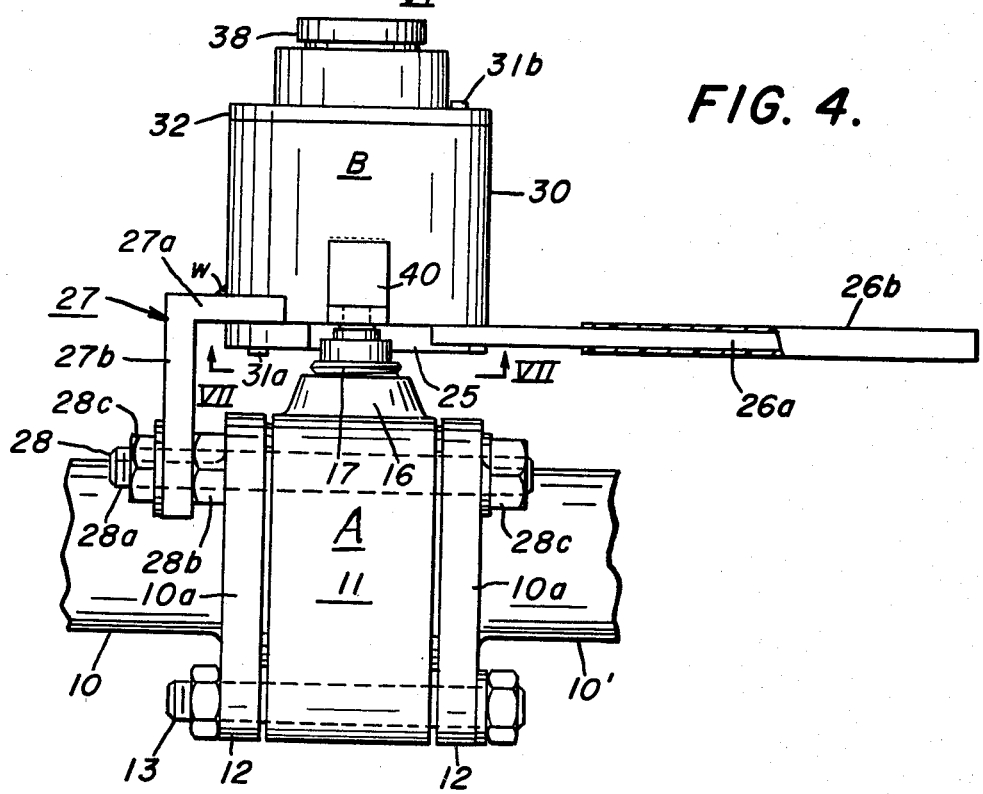
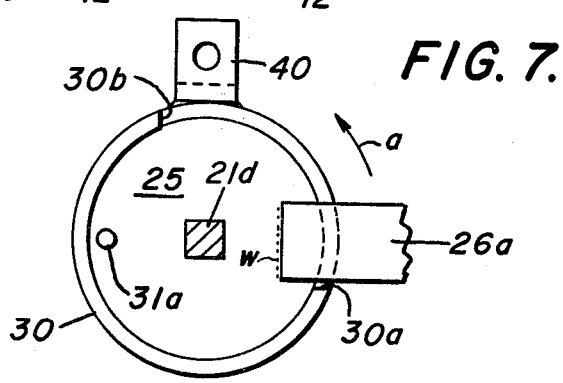

ROTARY VALVE ACTUATOR CONSTRUCTION

BRIEF SUMMARY OF THE INVENTION

This invention pertains to an improved actuator device that may be easily mounted in an operating position on a conventional rotative type of valve unit, such as a butterfly, plug or ball valve unit. A phase of the invention pertains to a valve actuator device that is positive in its operation and that will automatically operate in a substantially smooth and uniform spring-force-induced manner to, when its handle is released, automatically move the valve to a desired position which may be either a closed or an open position.

The actuator device of the present invention may be operated manually for moving it to one position, with the return position being accomplished by the use of a longitudinally or axially extending, helical or spiral type of spring. It is also adaptable to a fail-safe or so-called "dead man" type of operation, as effected by the use of a fusible linkage. In this connection, the valve may be manually moved under spring tension to desired position. For example, if the valve is to be employed in a pipe line through which an inflammable fluid is being moved, fusible linkage may normally retain it in an open position and then release it for spring-effected closure when there is a dangerous increase in temperature. On the other hand, where, for example, the valve is being used to control the flow of water or some other type of fire smothering fluid, then the fusible linkage may be used to release it for movement under spring action to an open position.

The construction of the present invention is such that it may be applied to a manually operated ball valve in such a manner that it will not interfere with its normal type of operation from the standpoint of the opening and closing of its valve element. It will automatically and with a uniform and smooth torque induced spring action move the valve element to a closed or open position when the operator releases it. The device may be mounted, as above indicated, on a horizontal or vertical plane to extend from a side of the housing of a valve unit, such as disclosed in my co-pending application Ser. No. 853,120, filed Nov. 21, 1977, and entitled "Bottom Entry Positive Acting Ball Valve". The actuator of the invention provides an automatic return for normally closing the valve element to which it is applied. Spring-loading is employed in such a manner as to effect a positive, torque-induced, substantially uniform and foolproof full return action on the valve stem when its manual operating hand is released.

BRIEF DESCRIPTION OF THE DRAWINGS

FIG. 1 is a side section in elevation illustrating an actuator unit of the invention as applied in an installed operating position with respect to a representative valve unit of a ball type. For the purpose of illustration, the valve unit is illustrated as having a three-part housing that is secured in an assembled relation by cross-extending, peripherally spaced-apart nut and bolt assemblies;

FIG. 2 is an end view in elevation on the same scale as and of the apparatus of FIG. 1;

FIG. 3 is a fragmental top plan view on the scale of and of the apparatus of FIGS. 1 and 2, but showing slightly enlarged piping portions of connector parts;

FIG. 4 is a side view in elevation on the same scale as FIG. 1 and of a slightly modified construction that uses a fusible link for actuator release;

FIG. 5 is a top plan view on the scale of FIG. 4, but showing slightly enlarged piping portions of connector parts;

FIG. 6 is a greatly enlarged fragmental section taken along the line VI—VI of FIG. 5 and illustrating fusible linkage;

And, FIG. 7 is a bottom plan view on the scale of and taken along the line VII—VII of FIG. 4.

DETAILED DESCRIPTION

There has been a need for an improved actuator unit for ball valve and other constructions which will widen the practical limits of valve sizes, which will provide a constant torque action and a smooth return movement of the valve stem and thus, of the valve element when either its manual operating handle or arm is manually released or is released through the agency of some means, such as a fusible means. Operating means in the construction shown can be employed to permit the valve to be fully or partially opened or closed as may be desired. The present types of actuators use a spring arrangement similar to that in a clock or record player wherein the spring spirals or convolutions are of different diameters and extend in a common plane. It has been determined that this has a basic disadvantage of giving a somewhat uneven, jumpy type of closing movement. The need is thus for a spring action which will apply a constant and substantially uniform torque for positively moving a valve to, for example, its fully closed position. This is contrasted to presently available types in which the torque applied varies during the movement, and there is, for example, about a two inch diameter size limitation for a ball valve that, as a practical matter, can be spring actuated to, for example, a closed position.

A valve having a flow diameter of up to about eight inches may be successfully operated by an actuator unit B of the present invention. Also, an actuator of the present invention may be easily and quickly mounted on a valve unit without disturbing the operating parts thereof. A representative application of an actuator of the invention is illustrated as applied to a ball valve unit. In this connection, a mounting bracket 27 extending from the actuator unit B may be used with bolt and nut assemblies 28 for both securing connector parts 10, 10' and 11 of the valve assembly A together and for securing the unit B in an operating position thereon. A rotative, bottom end wall member 25 of the actuator unit B may be secured on an extending wrench flat end portion 21d of a valve stem 21 in place of a conventional manual operating wheel or handle.

As particularly shown in FIGS. 1 to 3, a ball valve unit A is illustrated which has a pair of open, end connector housing parts 10 and 10', and an intermediate housing part 11 that are adapted to interfit with respect to each other and define a valve chamber and through-flow passageway longitudinally or axially therethrough. The end members or parts 10 or 10' are shown provided with three, equally spaced mounting portions 12 for receiving cross-extending nut and bolt assemblies 13 and/or 28. A pair of substantially planar ring gaskets 14 of a suitable material, such as Teflon, are carried in a seated relation between cooperating offset inner portions of the housing parts 10, 10' and 11 to seal-off the housing assembly and provide a fully enclosed operating chamber or passageway for a valve ball element 20.

A pair of oppositely positioned ball element seating and sealing rings 15, also of Teflon or other suitable material, are carried within recess portions of the end connectors 10 and 10' to engage the outer rounded wall surface of the ball element 20.

A side-extending open boss 16 extends from the intermediate housing part 11 to operatively bypass valve operating stem 21 therethrough. The stem 21 is mounted in a fluid-sealed-off rotatable relation within the boss 16 by a gasket and ring assembly 18 and gland nut 17. The innermost end of the stem 21 has a somewhat rectangular-shaped latching spline or lug 22 which is adapted to be slidably entered within a complementary latching slot 20a in the ball element 20 to provide an operating assembly. It will thus be apparent that, in this construction, the stem has to be entered from the inside of the housing assembly A.

The actuator unit B may, in accordance with the present invention be, as shown particularly in FIG. 1, operatively secured on and with respect to the valve unit A without disturbing the valve unit and its working parts. This may be effected by removing the nuts from one end of a pair of upper nut and bolt assemblies 13, by providing a substitute, slightly longer stem, nut and bolt pair of assemblies 28, and by slide-positioning the mounting bracket 27 in place on threaded stems 28a of the assemblies 28. It will be noted that each assembly bolt and nut 28 has a spacer nut 28b in addition to its outer end nuts 28c.

With particular reference to FIG. 1, the threaded end 21c of the valve stem 21 may extend centrally through a bore hole in the thickness of the wall of a rotatably mounted, circular, plate-like back bottom or inner closing-off end wall part of member 25 and be secured thereto for turning movement therewith by tightening-down a nut 23 on the threaded portion 21c. To prevent relative motion between the stem 21 and the rotatable end member 25, the bore hole in the latter and a cooperating wrench flat portion 21d of the stem 21 may be provided with a square or rectangular, complementary fit. In this figure, a slightly enlarged, intermediate portion 21b of the stem provides a limiting abutment for the positioning of the rotatable member 25 thereon. A washer 21a serves as a pressure washer that is engaged by gland nut 17 to hold gasket and ring assembly 18 in a sealing-off position within an upper, side-extending boss 16 of the intermediate valve housing part 11.

A manual operating handle 26 is shown secured to the under face of the rotatable bottom end wall member 25, as by weld metal w, to extend horizontally outwardly from the housing of the actuator B to provide sufficient turning leverage against opposing tension exerted by a helical or spiral spring 31. Stationary or fixed housing of the unit B has a hollow, tubular or cylindrical, upwardly endwise extending, enclosing side wall housing part 30, and a cooperating inset and interfitting top or front end wall closing-off part or member 32. The two parts 30 and 32 may be removable rigidly secured together by set screws 33 that are spaced about the outer periphery of the end part 32. The screws 33 may, for example, be of an Allen head type.

The actuator unit B is shown provided with a mounting bracket 27 of angular shape for removably securing its stationay housing to the housing assembly of the valve unit A. The bracket 27 has a horizontal, backwardly extending, shelf portion 27a that is secured, as by weld metal w, to an adjacent lower end portion of the cylindrical wall of the side housing 30. The bracket 27 also has a forwardly positioned, vertically extending, valve housing mounting portion 27b that, at its lower end (see FIGS. 1 and 2, has a pair of spaced-apart somewhat V-shaped feet or mounting tabs 27c that are provided with open-end slot portions. The slot portions of the feet 27c are adapted to fit over and rest upon stud or bolt portions of a pair of upper bolt and nut assemblies 28 of valve unit A.

To provide for a 90° rotative movement of the handle 26 for the rotatable bottom end wall member 25 within a bottom extending rim portion of the upright or vertical side housing part 30, a slot or cut-out portion extends circumferentially along the lower edge or skirt of the housing, between, end stops 30a and 30b that are defined by the rim portion, see particularly FIGS. 1 and 3 of the drawings. This permits the rotatable end wall member 25 to be moved within the housing part 30, for example, from a zero right-hand extending position against end stop 30a of FIGS. 1 and 3 to a 90° position against end stop 30b, in the direction indicated by the arrow a of FIG. 3.

An inner, tubular or cylindrical, centrally axially positioned and extending guide wall part or sleeve 35 is rotatably carried within the housing assembly of the actuating unit B and, at its lower end, is secured by weld metal on the inner side of the rotatable bottom end wall member 25. The tubular wall part 35 extends in a rotatable relation centrally through the upper end wall part 32 of the housing, and has a mounting guide collar 36 secured on its extending end portion by means of spaced-apart set screws 37 in a peripherally spaced relation thereabout. The guide sleeve 35 and collar 36, in cooperation with the stem 21, rotatably operatively position the bottom end member 25 within the inside of the lower open end portion of the cylindrical side wall 30 of the actuator housing.

An important aspect of the invention rests in the discovery that an axially extending type of spring 31 may not only be successively employed in an actuator, but as mounted in the illustrated construction, will eliminate adverse features that have heretofore existed in actuator utilizations. In FIG. 1, vertical or axially extending, helical coil spring 31, whose convolutions are of the same diameter, is shown carried within an operating spacing between the outer stationary wall provided by housing 30 and the inner rotative wall provided by the tubular guide member 35, and has a pair of offset, latching or mounting end portions 31a and 31b. As indicated in FIG. 1, lowermost end 31a extends vertically through and in a latching relation with respect to the rotatable bottom end wall member 27. On the other hand, the upper latching end portion 31b extends through the stationary top end wall member 32. The spring 31 thus is connected between the rotatable part 25 and the stationary part 32 in such a manner that a turning movement of the manual arm or handle 26 will tend to tension-flex its cylindrically extending convolutions to build-up and retain a resisting torque along its length extent, for example, through a 90° arc as shown in FIG. 3.

Also illustrated in FIG. 1 is a cylindrical wear-resisting bearing sleeve element or part 45 which extends along the outside of the tubular guide member 35 within the operating spacing defined between such tubular member and the housing side wall 30. The part 45 facilitates a smooth, uniform application of closing torque, as effected by the convolutions of the spring 31, without interfering with or resisting returning rotation of the tubular member 35. Thus, the tubular bearing sleeve 45 serves, as shown in FIG. 1, to isolate convolutions and prevent contact of such convolutions of the spring 31 with respect to the rotatable tubular guide member 35; it will be noted that the sleeve 45 extends along the full extent of the helical spring 31. A dust cap 38 is shown removably positioned on the upper open end of the tubular member 35 which may be removed when, for example, the actuator unit B is to be mounted or removed from a mounted position with respect to the ball valve unit A. This permits access to the nut 23. It will be apparent that the ball valve unit A may be easily changed for actuator control by removing its hand wheel or operating arm (not shown) from the wrench flat portion 21d of the stem 21, by removing an upper pair of the bolt and nut assemblies 13 and substituting bolt and nut assemblies 28 therefor, by sliding the rotative wall member 25 on the wrench flat portion 21d of the stem, by using nut and bolt assemblies 28 to mount the bracket 27 on the housing assembly of unit A, and by then applying and tightening-down the nut 23 on the threaded end 21c of the stem 21.

In FIGS. 5 to 7, inclusive, a so-called fail-safe or fusible link type of actuator device is shown. In this connection, the actuator unit B may be of the same construction as shown in FIGS. 1 to 3, inclusive, but with the addition of a fusible link assembly C. In employing this arrangement, an angle piece 40 is shown secured by weld metal w to the side of the stationary housing 30, and secured by a fusible stud-like link element 41 to handle 26a which is, in turn, secured by weld metal w to extend from the under side of the rotatable end wall member 25.

Assume that the ball of the valve assembly A is to be moved by the handle 26a from the position, shown in FIGS. 5 and 7 by the arrow a, from abutment with stop edge 30a of the housing 30 to abutment with the stop edge 30b thereof against spring tension by manual operation of the handle 26a. This, of course, will build up spring tension and thus opposing pressure which would normally return the ball valve to its starting position upon release of the handle 26a. However, using the linkage shown particularly in FIG. 6, the arm 26a and thus the wall member 25 may be retained in an advanced position by the inserting of the fusible pin 41. When a dangerous condition arises in which the pin 41 is fused or melted, then the arm 26a will be released and the spring 31 will actuate the valve stem 21 to move the ball to a closed or open position, whichever may be desired.

In these figures, the manual arm 26a is shown provided with a protective covering 26b and as extending in a straight line outwardly from the end wall member 25. In the embodiment of FIG. 1, the manual operating arm 26 is angularly offset to clear the rather large end mounting flange of the connector part 10'. The straight type of handle may be used for a relatively smaller size installation where the connecting flange of an end connector, such as 10', is of smaller diameter.

Although the actuator unit B of the invention is of special value as applied to a ball valve unit and has been shown as applied to a so-called top entry ball valve unit A, it also advantageously may be applied to a bottom entry ball valve unit in similar type of mounted relation. It, as previously indicated, may be used with any other rotary type of valve unit, such as of a plug or butterfly type. The axially extending spring 31 in its operative mounted positioning within the inside of the cylindrical housing 30 and about the cylindrical, inside-positioned sleeve bearing 45 assures a smooth and uniform closing torque action on the valve element under tension relieving force exerted by the spring after, for example, its convolutions have been moved by the handle 26 into an axially closing relation with respect to each other.

I claim:

1. In a valve actuator construction for a rotative valve unit having a housing whose wall defines a fluid flow passageway therethrough, having a boss open through the wall of the valve housing, and having an operating stem adapted to latch-engage within the ball valve and extend outwardly through the boss for rotating the valve within the passageway, the improvement which comprises: an actuator housing adapted to be secured in an endwise-extending and spaced-apart relation on the valve housing, said actuator housing having a tubular endwise extending side wall and a front end wall fixedly secured to close-off a front end of said side wall, a back end closure wall member rotatably positioned with respect to the back end of said side wall, a tubular guide member having its back end secured to said rotatable back end wall and extending forwardly therefrom in a spaced-apart operating-chamber-defining relation with respect to said tubular side wall, said tubular guide member at its forward end extending rotatably within said front end wall for rotation with said back end wall and with respect to said side wall, convoluted spring means operatively positioned in a spaced relation within and along said operating chamber between said side wall and said tubular guide member and at its back end being secured to said rotatable back end wall and at its front end being secured to said fixed end wall for resisting turning movement of the valve stem in one direction, operating means connected to said rotatable back end wall for rotating it and said tubular guide member with respect to said actuator housing for turning the valve stem to a valve operating position against tension exerted by said spring means, and said spring means being constructed and operatively positioned to smoothly and without interferring with rotation of said tubular guide member return said valve stem to an initial starting position upon release of force exerted by said operating means.

2. A valve actuator construction as defined in claim 1 wherein, said operating means extends transversely outwardly and is secured at its inner end to an outer side of said rotatable back end wall, and said tubular side wall of said actuator housing has a backwardly extending skirt portion that is slotted to bypass said operating means and restrict its movement between valve opening and closing positions of the valve stem.

3. A valve actuator construction as defined in claim 2 wherein, said spring means is of helical shape, and a tubular bearing sleeve is positioned about and along said tubular guide member to protect it from convolutions of said spring means during operation of said actuator and to thereby assure a smooth and uniform application of closing torque to the valve stem.

4. In an improved valve actuator construction for a rotative valve unit such as a ball valve that has a valve housing whose wall defines a fluid-flow passageway therethrough, has a valve element operatively positioned within the passageway for controlling fluid flow therethrough, and has an operating stem adapted to latch-engage with the valve element and extend outwardly through the wall of the valve housing in a fluid sealed-off relation with respect thereto for rotating the valve element within the passageway, the improved construction which comprises: a mounting bracket adapted to be secured to the valve housing and project therefrom in a spaced relation with respect to and along the stem, a stationary actuator housing secured on said mounting bracket and having an outwardly extending hollow enclosing side wall and a closing-off front end wall, a closing-off back end wall rotatably carried within an open back end of said side wall and adapted to be secured to said stem for actuating it, a tubular guide member secured at its back end to said rotatable end wall to project centrally forwardly in a spaced relation within and along said side wall and through and in a rotatably guided relation with respect to said front end wall, helical spring means operatively positioned within spacing defined between said side wall and said tubular guide member, one end of said spring means being secured to said back end wall and the other end thereof being secured to said front end wall in such a manner that valve operating rotation in one direction of said back end wall will be resisted by said spring means, operating means connected to turn said back end wall and said tubular guide member against tension of said spring to move the valve stem from an initial to a second valve operating position, and a tubular wear-resisting sleeve positioned between said spring means and said tubular guide member and along the extent of said spring means to, without interfering with rotating movement of said tubular guide member, assure a smooth and uniform application of closing torque by said spring means.

5. In a valve actuator construction as defined in claim 4 wherein said rotatable back end wall and said actuator housing have portions connected by a pin for retaining the valve in a desired position against tension force being exerted by said spring means and until said pin releases said rotatable back end member to permit a return movement of said operating member under torque exerted by said spring means.

* * * * *